(12) United States Patent
Guo et al.

(10) Patent No.: US 11,233,798 B2
(45) Date of Patent: Jan. 25, 2022

(54) SUBPROFILES FOR INTENT ON PAGE

(71) Applicant: Microsoft Technology Licensing, LLC, Redmond, WA (US)

(72) Inventors: Yu Guo, Sunnyvale, CA (US); Paul Fletcher, Sunnyvale, CA (US); Serin Yoon, Sunnyvale, CA (US); Shubham Anandani, Sunnyvale, CA (US); Kylan Matthew Nieh, Fremont, CA (US); Richard Ramirez, Los Altos, CA (US); Sheba Najmi, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 104 days.

(21) Appl. No.: 16/588,849

(22) Filed: Sep. 30, 2019

(65) Prior Publication Data

US 2021/0099457 A1     Apr. 1, 2021

(51) Int. Cl.
*G06F 15/16*     (2006.01)
*H04L 29/06*     (2006.01)
*H04L 29/08*     (2006.01)

(52) U.S. Cl.
CPC .......... *H04L 63/102* (2013.01); *H04L 63/105* (2013.01); *H04L 67/306* (2013.01)

(58) Field of Classification Search
CPC ............................ H04L 67/306; H04L 63/102
USPC .................................... 709/227, 228; 726/28
See application file for complete search history.

(56) References Cited

U.S. PATENT DOCUMENTS

2018/0349011 A1\*   12/2018   Morag .................. G06F 21/604

\* cited by examiner

*Primary Examiner* — Wing F Chan
*Assistant Examiner* — Andrew Woo
(74) *Attorney, Agent, or Firm* — Schwegman Lundberg & Woessner, P.A.

(57) ABSTRACT

Disclosed are systems, methods, and non-transitory computer-readable media for independently configurable sub-profiles that can be used to express intent within a user profile. A sub-profile is a portion of the user profile that can be assigned an independent set of visibility settings from the other portions of the user profile. A user may add profile data to a sub-profile and select visibility settings for the sub-profile that define access to the profile data included in the sub-profile. Accordingly, access to the profile data included in the sub-profile is managed according to a different set of visibility settings that the profile data included in other portions of the user profile (e.g., profile data not included in the sub-profile). This allows user to make certain profile data available to a different audience of users, either through accessing the user profile and/or through search.

20 Claims, 11 Drawing Sheets

420

Enter the Below Information:

422 — Title: [               ]

424 — Location: [               ]

426 — Job Types:
- ☐ Part-time
- ☐ Full-time
- ☐ Contract

428 — Alerts:
- ☐ Yes
- ☐ No

430 — Actions:
- ☐ Messaging
- ☐ Resume

432 — Visibility:
- ☐ Recruiters
- ☐ Contacts
- ☐ Everyone

434 — [ Submit ]

*FIG. 4C*

SUBPROFILES FOR INTENT ON PAGE

TECHNICAL FIELD

An embodiment of the present subject matter relates generally to user profiles and, more specifically, to sub-profiles for intent on page.

BACKGROUND

Online services allow users to connect with other users for purposes of networking. For example, users create user profiles that list the users' experience, interests, etc. The completed user profiles can be viewed by other users of the online service to gain insights about the users. For example, the user profiles may be used to identify potential job candidates, users with similar interests, users that provide needed services, etc. Current systems limit users to a singular user profile for sharing information. For example, the information included on the user profile is accessible to all other users that have access to the user profile. Users wishing to share some information with a wider audience while sharing other information with only a select set of other users are left to either compromise on one of these goals or create multiple profiles for each purpose. Accordingly, improvements are needed.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIGS. 4A-4D are screenshots of providing a sub-profile to express intent within a user profile, according to some example embodiments.

DETAILED DESCRIPTION

Figure 1:
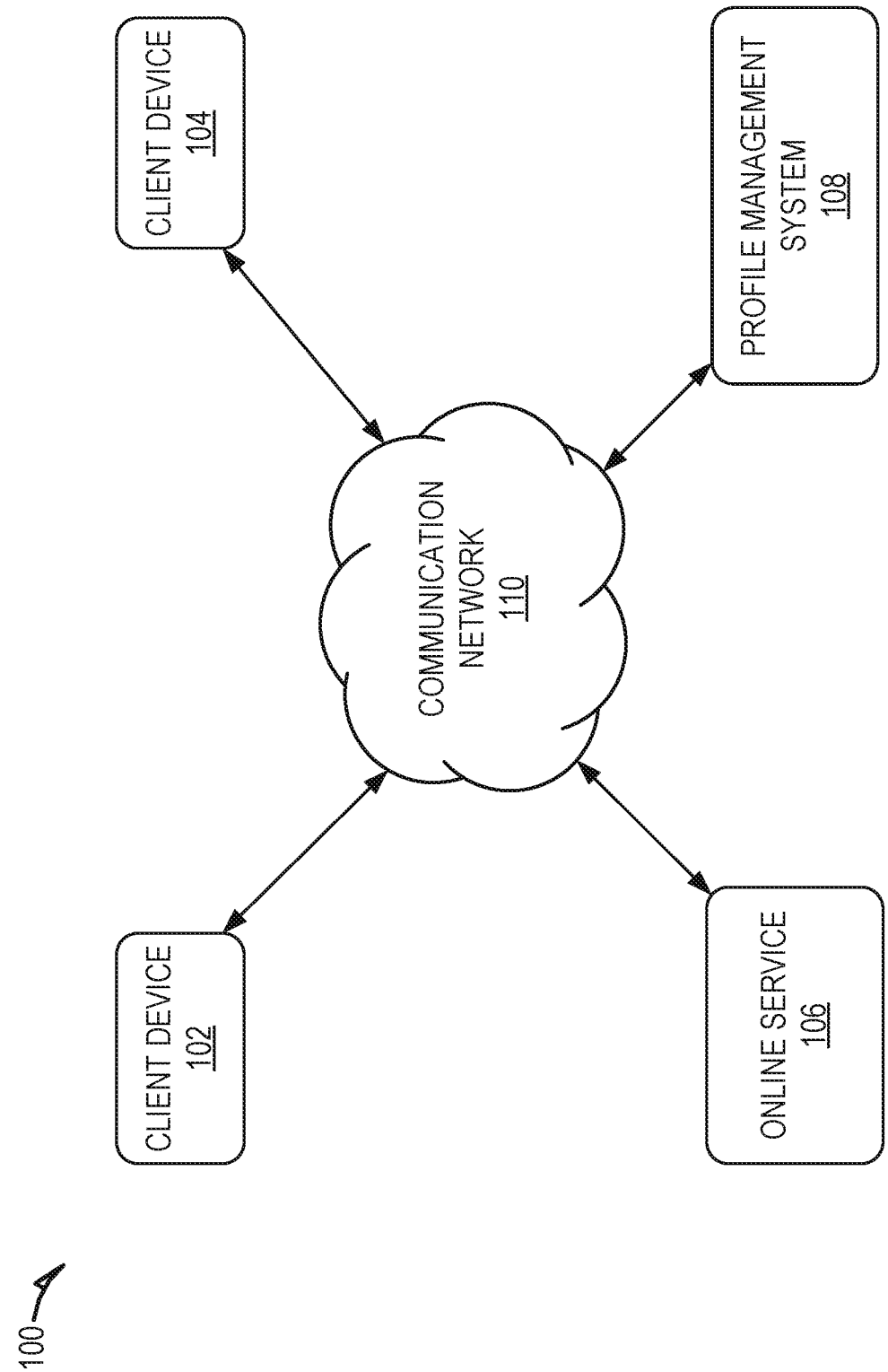
FIG. 1 shows a system for providing sub-profiles to express intent within a user profile, according to some example embodiments.

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for independently configurable sub-profiles that can be used to express intent within a user profile. An online service (e.g., LinkedIn) may allow users to connect with other users for purposes of networking. For example, each user of the online service may create a user profile that lists the respective user's experience, interests, etc. The completed user profiles can be viewed by other users of the online service to gain insights about the users. For example, the user profiles may be used to identify potential job candidates, users with similar interests, users that provide needed services, etc.

Current systems manage profile data included in each user profile in a uniform manner. For example, each piece of profile data included in the profile is presented consistently according to the visibility settings associated with the profile. The visibility settings define access to the user profile, such as by defining which users can and cannot view the profile data included in the user profile. As a result, each user that has access to the user profile may view all the profile data included in the user profile, while any user that is not granted access to the user profile cannot view any of the profile data included in the user profile.

Some users, however, may wish to make the profile data included in their profile available to different sets of users. For example, a user offering a service for sale may wish to include information describing the offered service in their profile and allow this information to be accessed by a wider audience of users, such as all other users of the online service. The same user may also wish to restrict other information included in their user profile to a limited group of users, such as their direct connections. As another example, a user that is actively looking for a new job may wish to include information indicating that they are actively seeking a job in their user profile and make this information available to users that are known recruiters. This user may also wish to hide that they are actively seeking a job from certain users, such as their employer and/or coworkers.

Accordingly, a technical problem exists regarding how to provide varied control over the profile data included in a user profile. To alleviate this issue, the online service utilizes a profile management system that enables users of the online service to create sub-profiles within a user profile. A sub-profile is a portion of the user profile that can be assigned an independent set of visibility settings that define access to the sub-profile, while access to other portions of the user profile are defined by a different set of visibility settings. A user may add profile data to a sub-profile and select visibility settings for the sub-profile that define access to the profile data included in the sub-profile. Accordingly, access to the profile data included in the sub-profile is managed according to a different set of visibility settings than the profile data included in other portions of the user profile (e.g., profile data not included in the sub-profile). This allows user to make profile data included in the sub-profile available to a different audience of users, either through accessing the user profile and/or through search.

The profile data included in a sub-profile may be presented as part of the user profile or separately. For example, the sub-profile may be presented within a designated portion of the user profile, such as within a designated window of the user profile. This may allow a user to prominently present the profile data included in the sub-profile, if so desired. Alternatively, the sub-profile may be presented without the other portions of the user profile. For example, in situations in which a user accessing the sub-profile is restricted from accessing the other portions of the user profile, the sub-profile may be presented to the user without the other portions of the user profile.

The sub-profile may also provide some select functionality to users that have access to the sub-profile. For example, a sub-profile that includes data describing services offered for sale by a user may also include functionality that allows other users to contact the user regarding the provided services. As another example, a sub-profile that includes data indicating that the user is interested in job openings may also include functionality that allows recruiters to download the user's resume or contact the user regarding an open position.

In some embodiments, a profile may include multiple sub-profiles and each sub-profile may be associated with a different intent or purpose. For example, a user may create one sub-profile indicating that the user is interested in job openings and another sub-profile indicating that the user is providing services for sale. Each sub-profile may be configured differently to include differently profile data, visibility settings, and functionality. Further, the intent or purpose of the sub-profile may be used to categorize the profile data for purposes of providing search results. For example, the online service may provide targeted search functionality based on a specific intent or purpose, such as providing a search targeting users interested in job openings or users offering services for sale.

FIG. 1 shows a system 100 for providing sub-profiles to express intent within a user profile, according to some example embodiments. As shown, multiple devices (i.e., client device 102, client device 104, online service 106, and profile management system 108) are connected to a communication network 110 and configured to communicate with each other through use of the communication network 110. The communication network 110 is any type of network, including a local area network (LAN), such as an intranet, a wide area network (WAN), such as the internet, or any combination thereof. Further, the communication network 110 may be a public network, a private network, or a combination thereof. The communication network 110 is implemented using any number of communication links associated with one or more service providers, including one or more wired communication links, one or more wireless communication links, or any combination thereof. Additionally, the communication network 110 is configured to support the transmission of data formatted using any number of protocols.

Multiple computing devices can be connected to the communication network 110. A computing device is any type of general computing device capable of network communication with other computing devices. For example, a computing device can be a personal computing device such as a desktop or workstation, a business server, or a portable computing device, such as a laptop, smart phone, or a tablet personal computer (PC). A computing device can include some or all of the features, components, and peripherals of the machine 800 shown in FIG. 8.

To facilitate communication with other computing devices, a computing device includes a communication interface configured to receive a communication, such as a request, data, and the like, from another computing device in network communication with the computing device and pass the communication along to an appropriate module running on the computing device. The communication interface also sends a communication to another computing device in network communication with the computing device.

In the system 100, users interact with the online service 106 to utilize the services provided by the online service 106. Users communicate with and utilize the functionality of the online service 106 by using the client devices 102 and 104 that are connected to the communication network 110 by direct and/or indirect communication.

Although the shown system 100 includes only two client devices 102, 104, this is only for ease of explanation and is not meant to be limiting. One skilled in the art would appreciate that the system 100 can include any number of client devices 102, 104. Further, the online service 106 may concurrently accept connections from and interact with any number of client devices 102, 104. The online service 106 supports connections from a variety of different types of client devices 102, 104, such as desktop computers; mobile computers; mobile communications devices, e.g., mobile phones, smart phones, tablets; smart televisions; set-top boxes; and/or any other network enabled computing devices. Hence, the client devices 102 and 104 may be of varying type, capabilities, operating systems, and so forth.

A user interacts with the online service 106 via a client-side application installed on the client devices 102 and 104. In some embodiments, the client-side application includes a component specific to the online service 106. For example, the component may be a stand-alone application, one or more application plug-ins, and/or a browser extension. However, the users may also interact with the online service 106 via a third-party application, such as a web browser, that resides on the client devices 102 and 104 and is configured to communicate with the online service 106. In either case, the client-side application presents a user interface (UI) for the user to interact with the online service 106. For example, the user interacts with the online service 106 via a client-side application integrated with the file system or via a webpage displayed using a web browser application.

The online service 106 is one or more computing devices configured to provide a social networking service. The online service 106 may provide any type of social networking service that allows a user to create a user account, view the user profiles of other users, make connections with other user accounts, post content and view content posted by other users. A user may establish connections with other users on the online service 106 to view each other's user profiles and/or content posted by the other user. An example of a social networking service is LINKEDIN.

A user may include information describing themselves (e.g., profile data) in their user account with the online service 106. For example, the user may include information such as their name, interests, location, job history, skills, goals (e.g., looking to find new opportunities), etc. The profile data included in a user account may be presented within a user profile of the user account. For example, other users may use a client device 102 to communicate with the online service 106 and request to access a user's profile. If the request is granted, the online service 106 causes presentation of the requested user profile on a display of the client device 102. The online service 106 determines whether to grant access to a user profile based on a set of visibility settings associated with the user profile. The visibility settings define access to the user profile, such as by defining which users can and cannot view the profile data included in the user profile.

As part of its provided service, the online service 106 allows users to create sub-profiles to express a specified intent. As explained earlier, current systems manage profile data included in each user profile in a uniform manner. For example, each piece of profile data included in the profile is presented consistently according to a single set of visibility settings associated with the profile that define access to the entirety of the user profile. As a result, each user that has access to the user profile may view all the profile data included in the user profile, while any user that is not granted access to the user profile cannot view any of the profile data included in the user profile.

The online service 106 utilizes the functionality of the profile management system 108 to enable the users of the online service 106 to create sub-profiles within their respective user profile. A sub-profile is a portion of the user profile that can be assigned an independent set of visibility settings from the other portions of the user profile. The profile management system 108 enables users to add profile data to a sub-profile and select visibility settings for the sub-profile that define access to the profile data included in the sub-profile. The visibility setting for the sub-profile may be different than the visibility settings for other portions of the user profile. Accordingly, the profile data included in the sub-profile is managed according to a different set of visibility settings than the profile data included in other portions of the user profile (e.g., profile data not included in the sub-profile). This allows user to make profile data included in the sub-profile available to a different set of users than the set of users that may access the other portions of the users profile.

Although the profile management system 108 is shown separately from the online service 106, this is for ease of explanation and is not meant to be limiting. In some embodiments, the functionality of the profile managements system 108 is partially or completely integrated within the online service 106.

The profile data included in a sub-profile may be presented as part of the user profile or separately. For example, the sub-profile may be presented within a designated portion of the user profile, such as within a separate window of the user profile. This may allow a user to prominently present the profile data included in the sub-profile, if so desired. Alternatively, the sub-profile may be presented without the other portions of the user profile. For example, in situations in which a user accessing the sub-profile is restricted from accessing the other portions of the user profile, the sub-profile may be presented to the user without the other portions of the user profile.

The profile management system 108 enables users to assign functionality to the sub-profile. For example, a user may assign functionality to a sub-profile that allows other users to contact the user (e.g., regarding services provided by the user or an open employment position), download data (e.g., the user's resume), etc.

The profile management system 108 allows users to add multiple sub-profiles to their user profile. Each sub-profile may be associated with a different intent or purpose. For example, a user may create one sub-profile indicating that the user is interested in job openings and another sub-profile indicating that the user is providing services for sale. Each sub-profile may be configured differently to include differently profile data, visibility settings, and functionality based on the intent of the sub-profile. Further, the intent or purpose of the sub-profile may be used to categorize the profile data for purposes of providing search results. For example, the online service 106 may provide targeted search functionality based on a specific intent or purpose, such as providing a targeted search for users interested in job openings or users offering services for sale.

Figure 2:
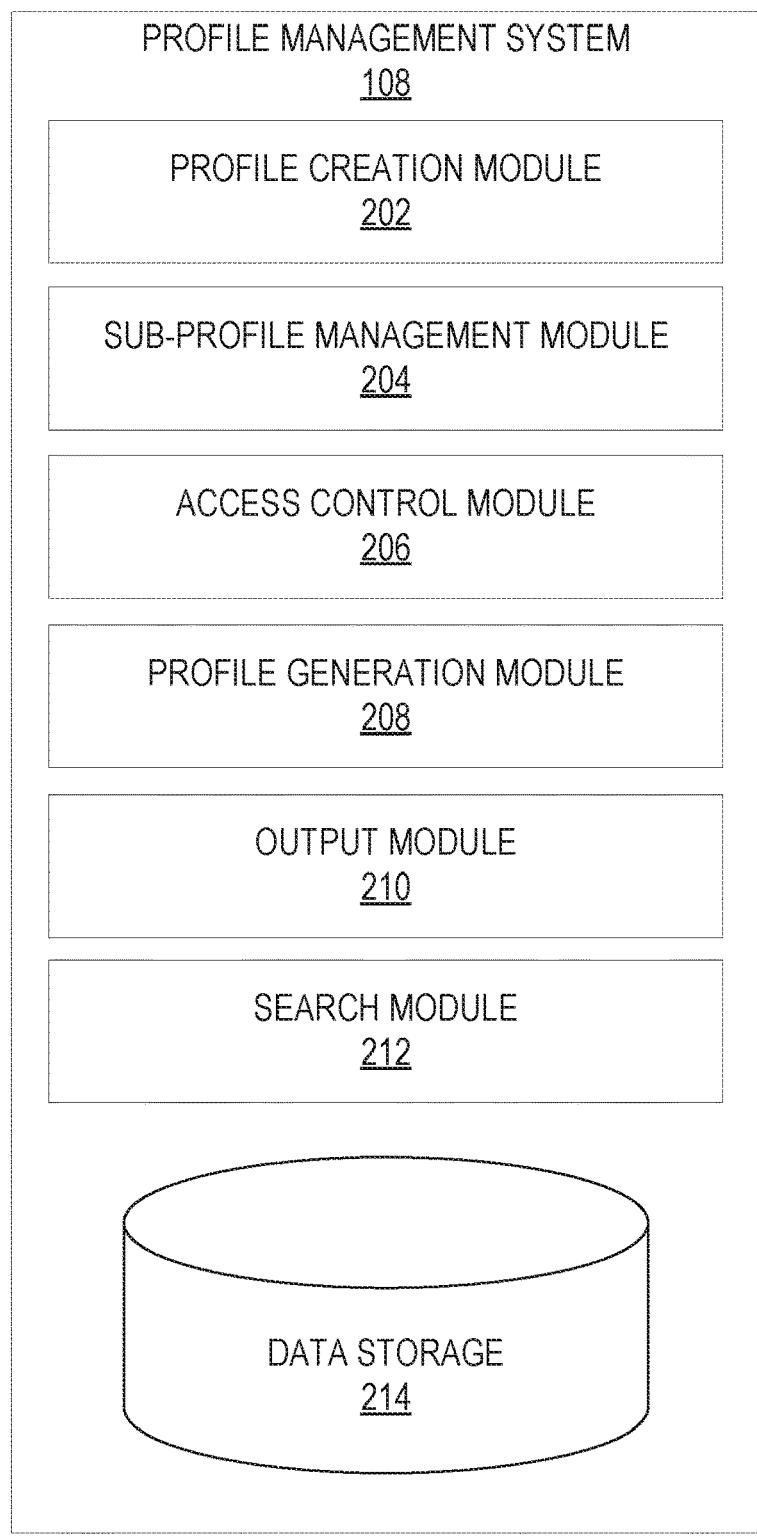
FIG. 2. is a block diagram of a profile management system, according to some example embodiments.

FIG. 2 is a block diagram of a profile management system 108, according to some example embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the profile management system 108 to facilitate additional functionality that is not specifically described herein. Furthermore, the various functional modules depicted in FIG. 2 may reside on a single computing device or may be distributed across several computing devices in various arrangements such as those used in cloud-based architectures. For example, the various functional modules and components may be distributed amongst computing devices that facilitate both the profile management system 108 and the online service 106.

As shown, the profile management system 108 includes a profile creation module 202, a sub-profile management module 204, an access control module 206, a profile generation module 208, an output module 210, a search module 212, and a data storage 214.

The profile creation module 202 facilitates creation of a user profile for a user account. This includes prompting the user for profile data to be included in the user profile. For example, the profile data may include the user's name, location, picture, work history, education history, etc. The profile creation module 202 may also prompt the user to select visibility settings associated with the user profile and/or assign default visibility settings to the user profile. The visibility settings define access to the user profile, such as by defining which users can and cannot view the profile data included in the user profile. For example, the profile creation module 202 may prompt the user to define groups of users that may access the user profile, such as all users, direct connections, direct connections and their direct connections, etc. The profile creation module 202 may also enable the user to identify specific users that should not be allowed to view the user profile, such as by adding users to a blocked or black list. The profile creation module 202 stores the received profile data and visibility setting in the data storage 214, where it is associated with a unique account identifier for the user's account with the online service 106.

The sub-profile management module 204 facilitates creation and management of sub-profiles to be included in a user profile. A sub-profile is a portion of the user profile that can be configured independently from the other portions of the user profile. For example, the sub-profile may be assigned a different set of visibility settings than the visibility setting assigned to other portions of the user profile. Accordingly, a user can configure the sub-profile to be accessible to a broader audience of users than can access the other portions of the user's profile. This may be beneficial when a user is searching for a new job, selling services, looking to build relationships for mentoring, etc.

In some embodiments, the sub-profile management module 204 enables users to assign functionality to a sub-profile. For example, the user may wish to provide other users that have access to the sub-profile with the ability to message the user, access specified data, etc. The sub-profile management module may prompt the user to select from a set of provided functionality and/or assign default functionality to the sub-profile.

In some embodiments, the sub-profile management module 204 may enable the user to generate a sub-profile to express a specified intent or purpose. For example, sub-profiles may be used to express intents such as the user being interested in new career opportunities, selling services, interested in philanthropy, interested in mentoring, etc. In these types of embodiments, the sub-profile management module 204 may utilize a different sub-profile template for each intent. The sub-profile template for each intent defines the types of profile data that are included in the sub-profile as well default visibility settings and functionality for the sub-profile. For example, a sub-profile template to express an intent such as the user being interested in new career opportunities may include profile data such as the user's skills, work history, desired job title and job location, as well as functionality to message the user and/or download the user's resume. As another example, the sub-profile template to express an intent such as the user providing services for sale may include profile data describing the service provided, the cost, the geographic location in which the service is offered, as well as functionality to message the user and/or book the services.

The sub-profile management module 204 may prompt the user to create sub-profiles for various intents. Accordingly, the users profile may include multiple sub-profiles for different intents. For example, the sub-profile management module 204 may present a prompt to create a sub-profile from within a user interface when the user logs into their account with the online service 106. As another example, the sub-profile management module 204 may message the user a prompt to create the sub-profile, such as by sending the user an email, direct message, etc.

The sub-profile management module 204 generates a sub-profile based on the profile data and configurations (e.g., visibility settings, selected features, etc.) provided by the user. For example, the sub-profile management module 204 updates the user's profile in the data storage 214 to include the data associated with each generated sub-profile. The functionality of the sub-profile management module 204 is discussed in greater detail in relation to FIG. 3.

The access control module 206 facilitates access to user profiles. For example, the access control module 206 receives requests to access user profiles from client devices 102, 104 and determines how to respond to the requests. That is, the access control module 206 determines whether to approve or deny each request, and also determines what profile data should be returned in response to an approved request. The access control module 206 determines how to respond to the access request based on visibility settings associated with the user profile, as well as the user that is requesting access to the user profile (the requesting user).

The request may include data identifying the requesting user, such as a user identifier or account identifier associated with the requesting user. The request may also include data identifying the user profile that the requesting user is attempting to access, such as the account identifier associated with the user profile. The access control module 206 uses the received data to access information about the requesting user from the data storage 214, as well as the visibility settings associated with the user profile. The visibility settings for the user profile may include multiple sets of visibility settings, such as the set of visibility settings assigned to the user profile and the set of visibility settings assigned to each sub-profile included in the user profile.

The access control module 206 uses the gathered data to determine whether to allow or deny the request. For example, the access control module 206 determines whether the requesting user falls within a set of users defined by any of the sets of gathered visibility settings as being authorized to access some portion of the user profile (e.g., the user profile and/or any sub-profile of the user profile). For example, a set of visibility setting may define that access to a user profile or sub-profile corresponding to the set of visibility settings is limited to direct connections of the user. Accordingly, the access control module 206 determines whether the requesting user is a direct connection that is authorized to access the user profile and/or sub-profile.

The access control module 206 denies the request when the user does not fall within any set of users defined by the sets of gathered visibility settings as being authorized to access at least some portion of the user profile. Alternatively, the access control module 206 allows the request when the access control module 206 determines that the requesting user does fall within at least one set of users defined by the sets of gathered visibility settings as being authorized to access at least some portion of the user profile.

The profile generation module 208 generates a version of the user profile to return in response to an allowed request. The use of sub-profiles within a user profile allows for varying sets of visibility settings. Accordingly, different users that access the user profile may be provided with varying versions of the user profile based on the visibility settings assigned to the user profile and any sub-profiles included in the user profile. The profile generation module 208 first determines which portions of the user profile that the requesting user is authorized to access and then generates a version of the user profile that includes the identified portion of the user profile. The version of the user profile generated by the profile generation module 208 does not include any portion of the user profile that the user is not authorized to access.

The output module 210 returns the version of the user profile generated by the profile generation module 208 to the client device 102 that transmitted the request to access the user profile. The client device 102 presents the returned version of the user profile to the requesting user. For example, the returned version of the user profile is presented on a display of the client device 102.

The search module 212 provides search functionality that enables users to search the user profiles. For example, the search module 212 presents a search interface on a client device 102, which a user may use to enter a search query including one or more keywords. The search module 212 searches the user profiles in the data storage 214 based on the provided search query to generate a set of search results, which the search module 212 returns to the client device 102. The search results may then be presented to the requesting user within the search interface.

The search module 212 uses the functionality of the access control module 206 to provide search results that the requesting user is authorized to access. Accordingly, the search module 212 will not include or return search results including profile data that the requesting user is not authorized to access.

The search module 212 may also enable users to execute targeted searches based on specific intents expressed by users through use of a sub-profile. For example, the search module 212 may enable a user to target a search to users that are open to new career opportunities, providing services for sale, looking for mentorship opportunities, etc. In these types of embodiments, the search module 212 may execute the search on sub-profiles that express the selected intent. For example, the search module 212 may execute a search targeted to users that are open to new career opportunities by performing a search limited to sub-profiles that express that a user is open to new career opportunities. Similarly, the search module 212 may execute a search targeted to users that provide services for sale by performing a search limited to sub-profiles that express that a user provides services for sale. By limiting the search to the relevant sub-profiles, the search module 212 reduces the time and resources associated with executing a search query.

Figure 3:
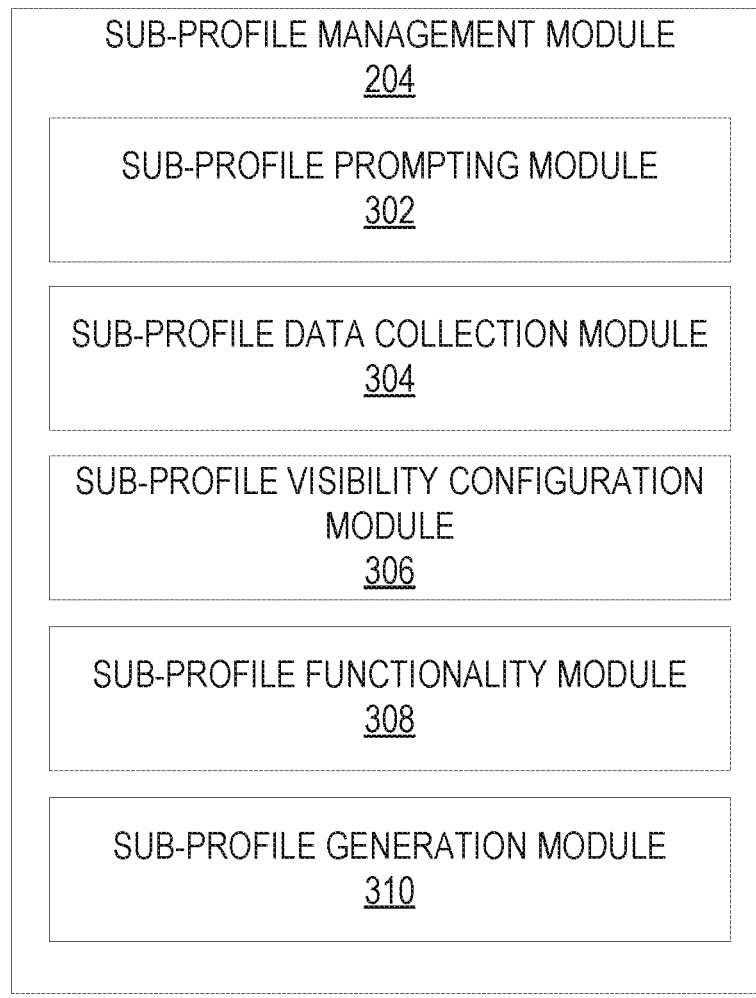
FIG. 3 is a block diagram of a sub-profile management module, according to some example embodiments.

FIG. 3 is a block diagram of a sub-profile management module 204, according to some example embodiments. To avoid obscuring the inventive subject matter with unnecessary detail, various functional components (e.g., modules) that are not germane to conveying an understanding of the inventive subject matter have been omitted from FIG. 3. However, a skilled artisan will readily recognize that various additional functional components may be supported by the sub-profile management module 204 to facilitate additional functionality that is not specifically described herein. Furthermore, the various functional modules depicted in FIG. 3 may reside on a single computing device or may be distributed across several computing devices in various arrangements such as those used in cloud-based architectures. For example, the various functional modules and components may be distributed amongst computing devices that facilitate both the sub-profile management module 204 and the online service 106.

As shown, the sub-profile management module 204 includes a sub-profile prompting module 302, a sub-profile data collection module 304, a sub-profile visibility configuration module 306, a sub-profile functionality module 308, and a sub-profile generation module 310.

The sub-profile prompting module 302 prompts users to create a sub-profile. For example, the sub-profile prompting module 302 may present a prompt to create a sub-profile from within a user interface when the user logs into their account with the online service 106. As another example, the sub-profile prompting module 302 may message the user a prompt to create the sub-profile, such as by sending the user an email, direct message, etc. The sub-profile prompting module 302 may prompt the user to create a sub-profile for each intent the user would like to express. Accordingly, the user's profile may include multiple sub-profiles for each of the different intents.

The sub-profile data collection module 304 collects profile data to be included in a sub-profile. For example, the sub-profile data collection module prompts the user for specified data such as by presenting text boxes that the user can use to enter the profile data, dropdown bars from which the user can select the correct profile date, etc. The sub-profile data collection module 304 may prompt the user for profile data based on the intent of the sub-profile. Sub-profiles may be used to express intents such as the user being interested in new career opportunities, selling services, interested in philanthropy, interested in mentoring, etc. In these types of embodiments, the sub-profile data collection module 304 may utilize a sub-profile template for the corresponding intent when prompting the user for profile data. The sub-profile template for each intent defines the types of profile data that are included in the sub-profile as well default visibility settings and functionality for the sub-profile. For example, a sub-profile template to express an intent such as the user being interested in new career opportunities may include profile data such as the user's skills, work history, desired job title and job location, as well as functionality to message the user and/or download the user's resume. As another example, the sub-profile template to express an intent such as the user providing services for sale may include profile data describing the service provided, the cost, the geographic location in which the service is offered, as well as functionality to message the user and/or book the services.

The sub-profile visibility configuration module 306 prompts the user to select visibility settings for the sub-profile. The available visibility setting that the sub-profile visibility configuration module 306 allows the user to select from may vary based on the intent of the sub-profile. Further, the sub-profile visibility configuration module 306 may assign default visibility settings. For example, the sub-profile visibility configuration module 306 may assign default visibility settings based on the intent of the sub-profile.

The sub-profile functionality module 308 prompts the user to select functionality to be provided along with the sub-profile. The available functionality that the sub-profile functionality module 308 allows the user to select from may vary based on the intent of the sub-profile. Further, the sub-profile functionality module 308 may assign default functionality based on the intent of the sub-profile.

The sub-profile generation module 310 generates a sub-profile based on the profile data and configurations (e.g., visibility settings, selected features, etc.) provided by the user. For example, the sub-profile generation module 310 updates the user profile in the data storage 214 to include the data associated with each generated sub-profile.

Figure 4A:
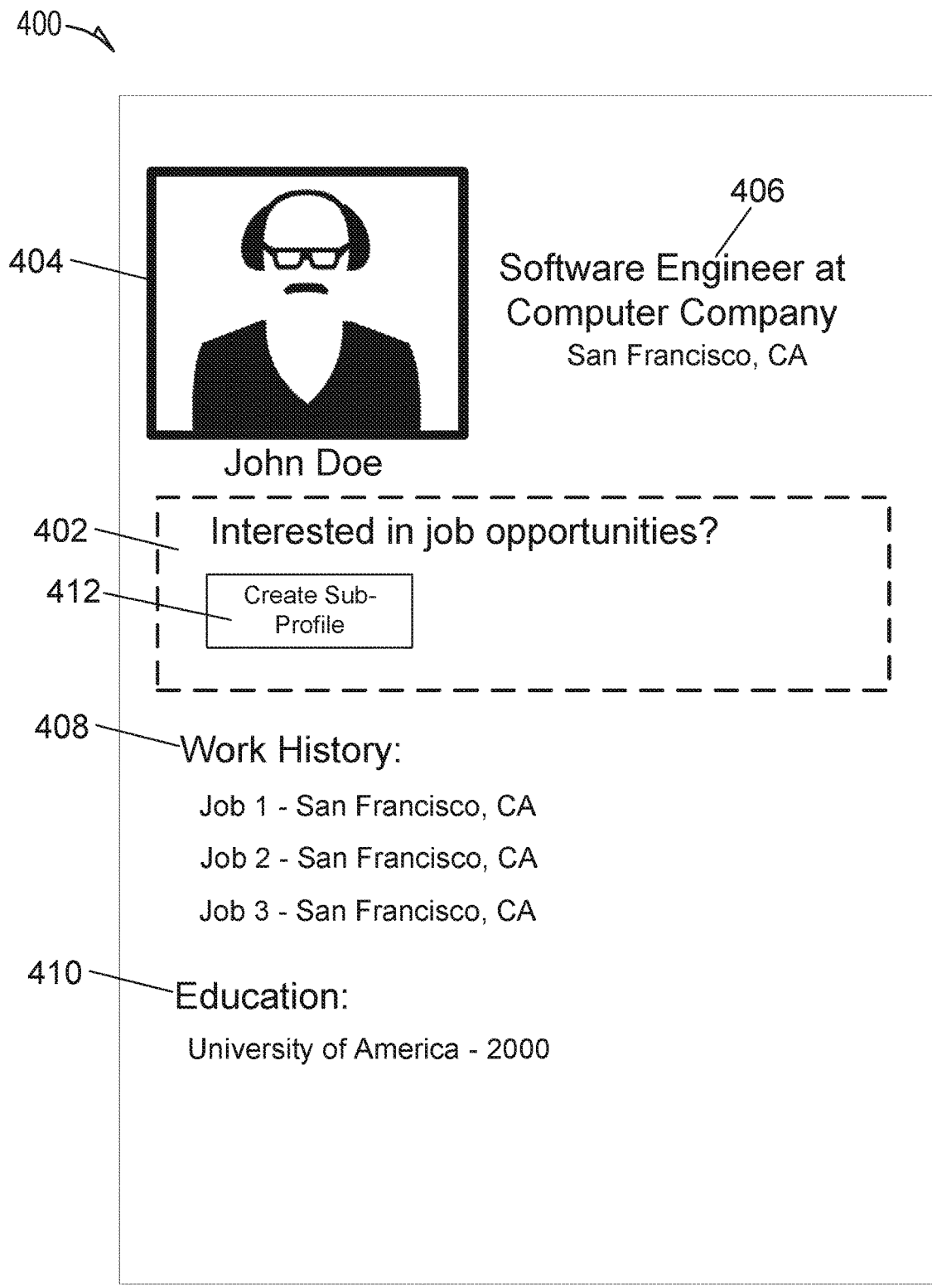

FIGS. 4A-4D are screenshots of providing a sub-profile to express intent within a user profile, according to some example embodiments. FIG. 4A shows a user profile 400 that includes a prompt 402 to add a sub-profile to the user profile 400. The user profile 400 includes profile data about the user, such as an image 404 of the user, a current job title 406, a work history 408 and an education history 410. The user profile also includes the prompt 402 to create the sub-profile. The prompt 402 specifically prompts the user to create a sub-profile expressing the user's intent of being interested in available job opportunities. The prompt 402 includes a button 412, which the user may select to create a sub-profile expressing the intent of being interested in available job opportunities.

Figure 4B:
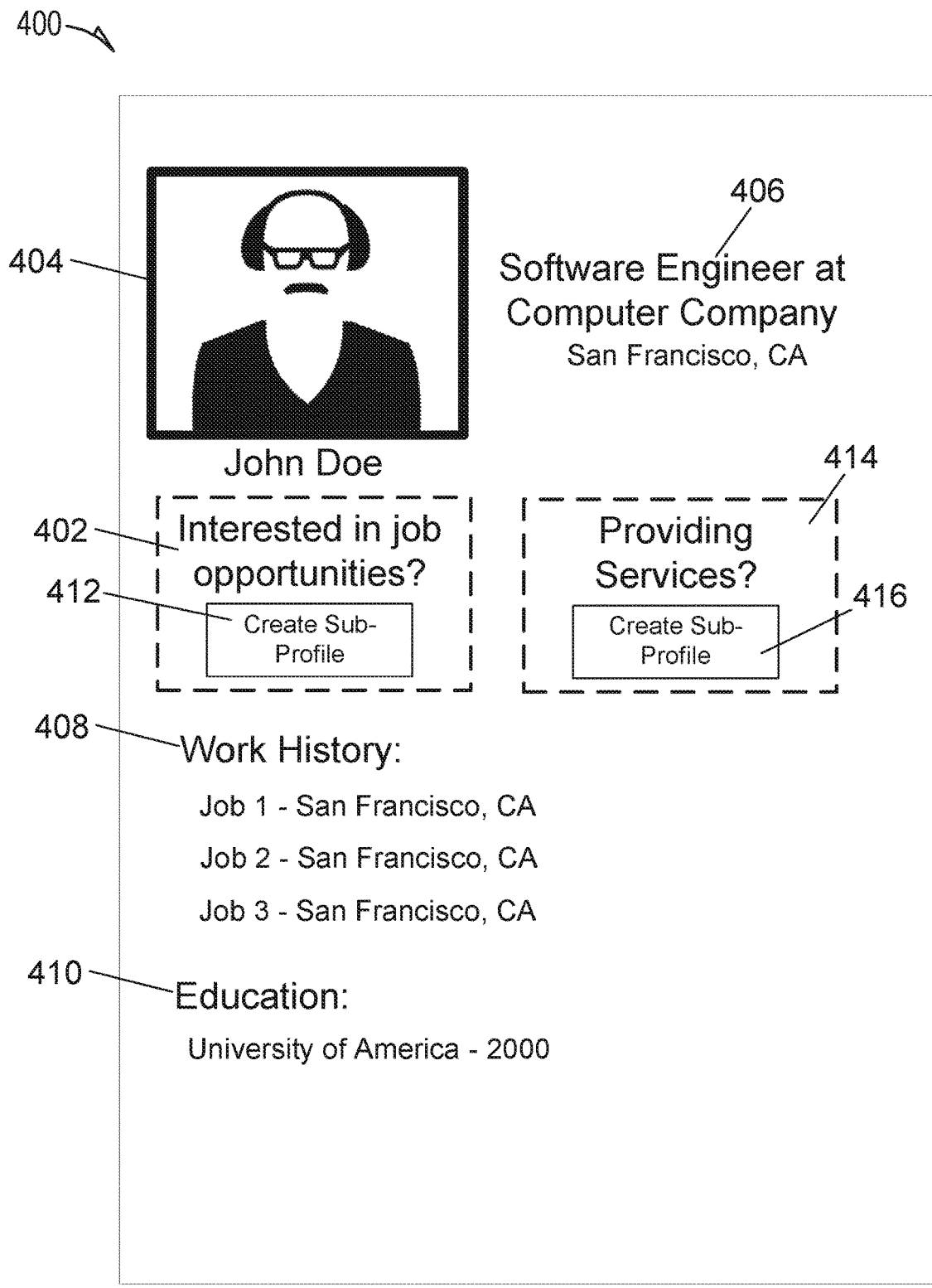

FIG. 4B shows a user profile 400 that includes two prompts 402, 412 to create sub-profiles. As show, one prompt 402 prompts the user to create a sub-profile expressing the user's intent of being interested in available job opportunities, and the other prompt 414 prompts the user to create a sub-profile expressing the user's intent of providing services for sale. Each prompt 402, 414 includes a button 412, 416, which a user may select to create the corresponding sub-profile. For example, a user would select the button 412 in the prompt 402 on the left to create a sub-profile expressing that the user is interested in available job opportunities. Likewise, the user would select the button 416 in the prompt 414 on the right to create a sub-profile expressing that the user offers services for sale.

FIG. 4C shows an interface 420 that prompts the user to enter profile information to include in a sub-profile indicating that the user is interested in available job opportunities. The interface 420 may be presented as a result of the user selecting the button 412 included the prompt 402 on the left. As shown, the interface 420 prompts the user to enter profile data for the sub-category, such as a job title 422 of interest, a geographic location 424, job types 426, whether the user would like to receive notifications 428, functionality 430 to be included in the sub-profile, and to set visibility settings 432 for the sub-profile. The user may use the interface 420 to provide the requested profile data and settings for the sub-profile. The user may select the submit button 434 included in the interface 420 to submit the profile data and settings to be used to generate the sub-profile.

Figure 4D:
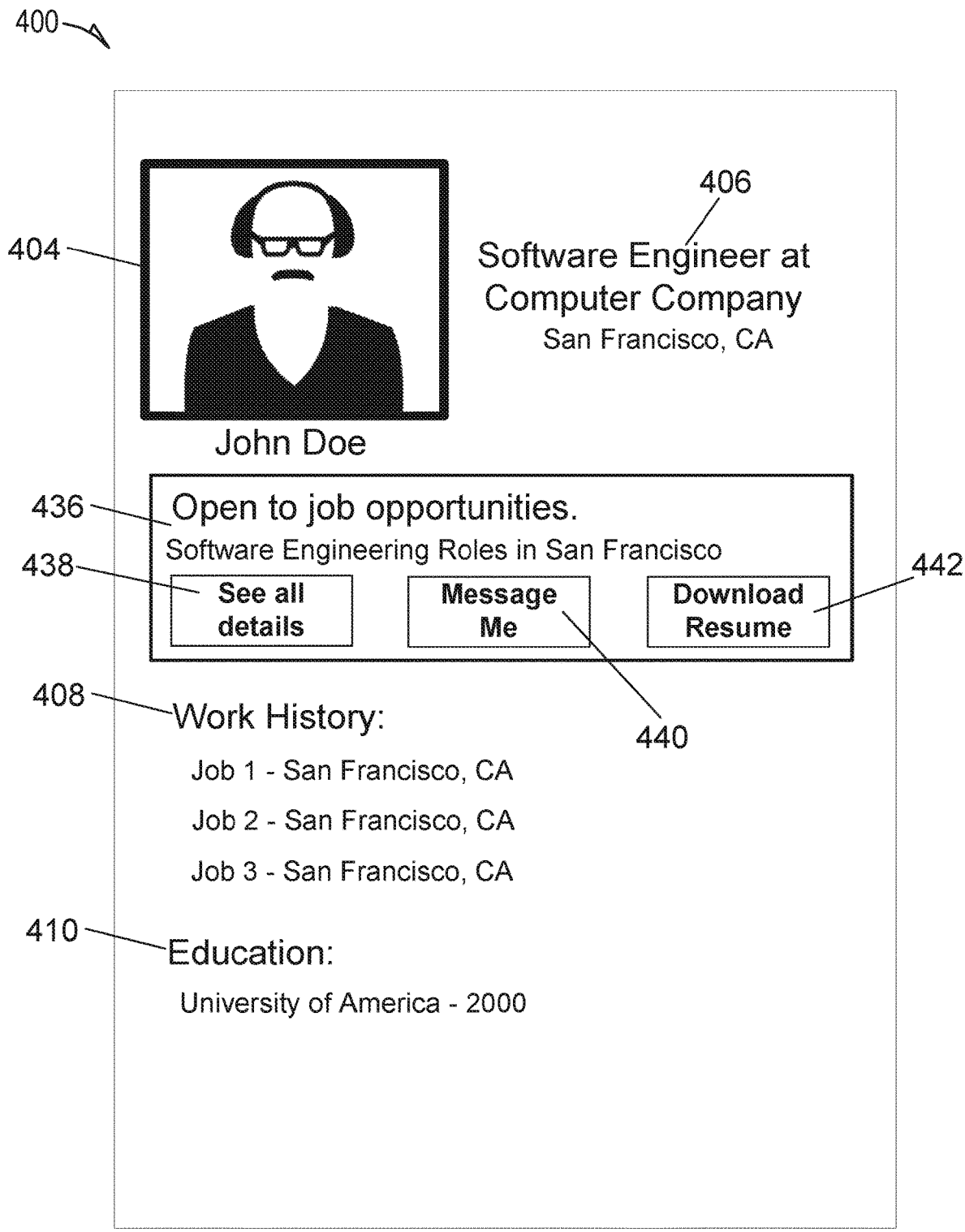

FIG. 4D shows the user profile 400 that includes the generated sub-profile 436. As shown, the sub-profile 436 expresses that the user is open to job opportunities and includes information such as the title and geographic location of the jobs the user is interested in. The sub-profile also includes three buttons 438, 440, 442 that may be selected to perform additional functionality. For example, the first button 438 allows for additional information about the user to be accessed, the second button 440 allows for a message to be sent to the user, and the third button 442 allows for the user's resume to be downloaded. Another user viewing the sub-profile 436 may utilize any of the included buttons 438, 440, 442 to cause the corresponding action.

Figure 5:
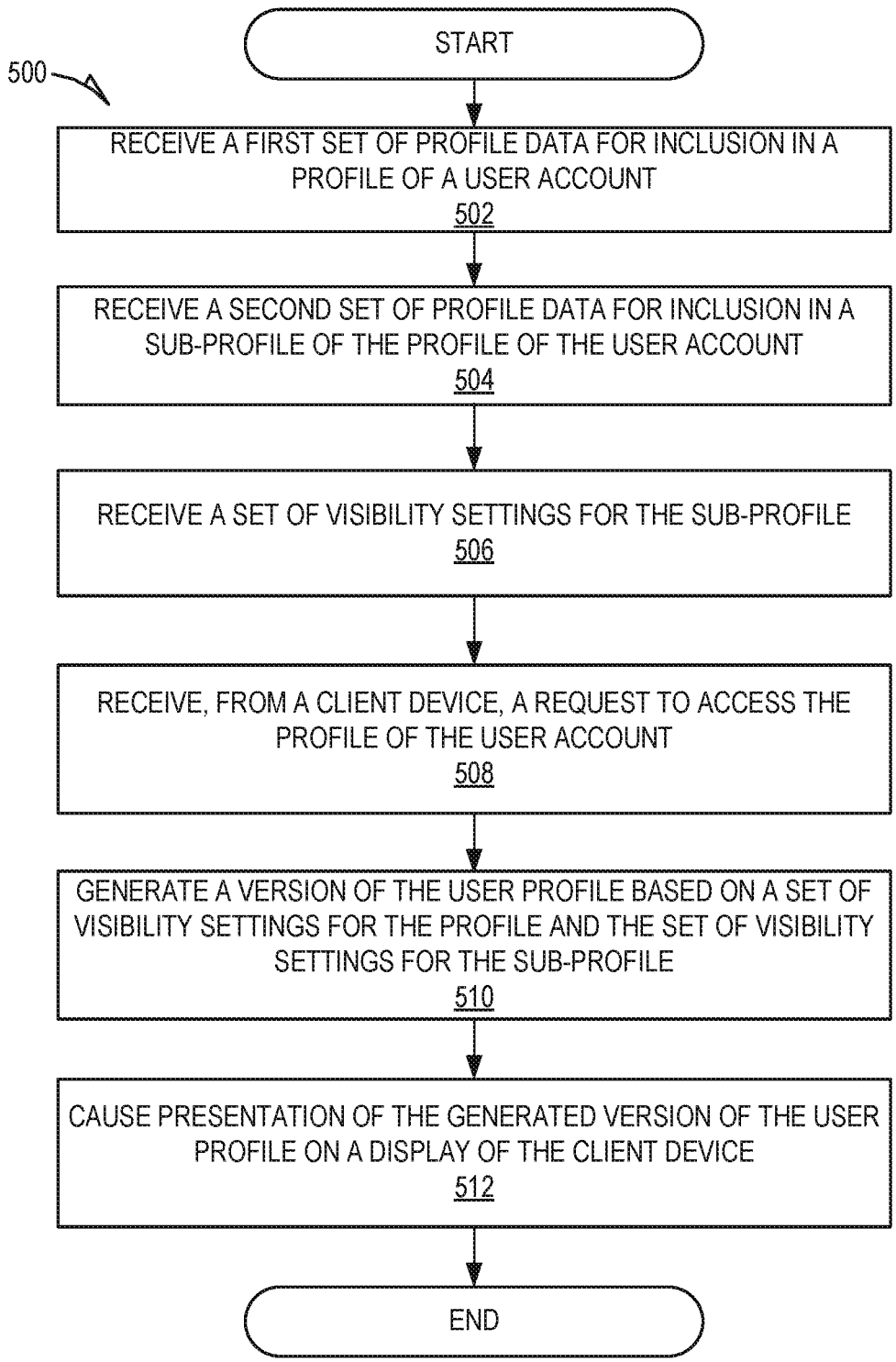
FIG. 5 is a flowchart showing a method of providing a sub-profile to express intent within a user profile, according to some example embodiments.

FIG. 5 is a flowchart showing a method 500 of providing a sub-profile to express intent within a user profile, according to some example embodiments. The method 500 may be embodied in computer readable instructions for execution by one or more processors such that the operations of the method 500 may be performed in part or in whole by the profile management system 108; accordingly, the method 500 is described below by way of example with reference thereto. However, it shall be appreciated that at least some of the operations of the method 500 may be deployed on various other hardware configurations and the method 500 is not intended to be limited to the profile management system 108.

At operation 502, the profile creation module 202 receives a first set of profile data for inclusion in a profile of a user account. The profile creation module 202 facilitates creation of a profile for a user account. This includes prompting the user for profile data to be included in the user profile. For example, the profile data may include the user's name, location, picture, work history, education history, etc. The profile creation module 202 may also prompt the user to select visibility settings associated with the user profile and/or assign default visibility settings. The visibility settings define access to the user profile, such as by defining which users can and cannot view the profile data included in the user profile. For example, the profile creation module 202 may prompt the user to define groups of users that may access the user profile, such as all users, direct connections, direct connections and their direct connections, etc. The profile creation module 202 may also enable the user to identify specific users that should not be allowed to view the user profile, such as by adding users to a blocked or black list. The profile creation module 202 stores the received profile data and visibility setting in the data storage 214, where it may be associated with a unique account identifier for the user's account with the online service 106.

At operation 504, the sub-profile management module 204 receives a second set of profile data for inclusion in a sub-profile of the profile of the user account. The sub-profile management module 204 facilitates creation and management of sub-profiles to be included in a user profile. A sub-profile is a portion of the user profile that can be configured independently from the other portions of the user profile. For example, the sub-profile may be assigned a different set of visibility settings than the visibility setting assigned to other portions of the user profile. Accordingly, at operation 506, the sub-profile management module 204 receives a set of visibility settings for the sub-profile. The set of visibility settings for the sub-profile may be different than the set of visibility setting for the user profile. This allows a user to configure the sub-profile to be accessible to a different (e.g., broader or narrower) audience of users than can access the other portions of the users profile. This may be beneficial when a user is searching for a new job, selling services, looking to build relationships for mentoring, etc.

At operation 508, the access control module 206 receives, from a client device, a request to access the profile of the user account. The access control module 206 facilitates access to user profiles. For example, the access control module 206 receives requests to access user profiles from client devices 102, 104 and determines how to respond to the requests. For example, the access control module 206 determines whether to approve or deny each request, and determines what profile data should be returned in response to an approved request. The access control module 206 determines how to respond to the access request based on visibility settings associated with the user profile, as well as the user that is requesting access to the user profile.

The request may include data identifying the requesting user, such as a user or account identifier associated with the requesting user. The request may also include data identifying the user profile that the requesting user is attempting to access, such as the account identifier associated with the user profile. The access control module 206 uses the received data to access information about the requesting user from the data storage 214, as well as the visibility settings associated with the user profile. The visibility settings for the user profile may include multiple sets of visibility settings, such as the set of visibility settings assigned to the user profile and the set of visibility settings assigned to each sub-profile included in the user profile.

The access control module 206 uses the gathered data to determine whether to allow or deny the request. For example, the access control module 206 determines whether the requesting user falls within a set of users defined by any of the sets of gathered visibility settings as being authorized to access some portion of the user profile (e.g., the user profile and/or any sub-profile of the user profile). For example, a set of visibility setting may define that access to a user profile or sub-profile corresponding to the set of visibility settings is limited to direct connections of the user. Accordingly, the access control module 206 determines whether the requesting user is a direct connection that is authorized to access the user profile and/or sub-profile.

The access control module 206 denies the request when the user does not fall within any set of users defined by the sets of gathered visibility settings as being authorized to access at least some portion of the user profile. Alternatively, the access control module 206 allows the request in the event that the access control module 206 determines that the requesting user does fall within at least one set of users defined by the sets of gathered visibility settings as being authorized to access at least some portion of the user profile.

At operation 510, the profile generation module 208 generates a version of the user profile based on a set of visibility settings for the user profile and a set of visibility setting for the sub-profile. The use of sub-profiles within a user profile allows for varying sets of visibility settings. Accordingly, different users that access the user profile may be provided with different versions of the user profile based on the visibility settings assigned to the user profile and any sub-profiles included in the user profile. The profile generation module 208 first determines which portions of the user profile that the requesting user is authorized to access and then generates a version of the user profile that includes the identified portion of the user profile. The version of the user profile generated by the profile generation module 208 does not include any portion of the user profile that the user is not authorized to access.

At operation 512, the output module 210 causes presentation of the generated version of the user profile on a display of the client device 102. For example, the output module 210 returns the version of the user profile generated by the profile generation module 208 to the client device 102. The client device 102 then presents the returned version of the user profile to the requesting user. For example, the returned version of the user profile is presented on the display of the client device 102.

Figure 6:
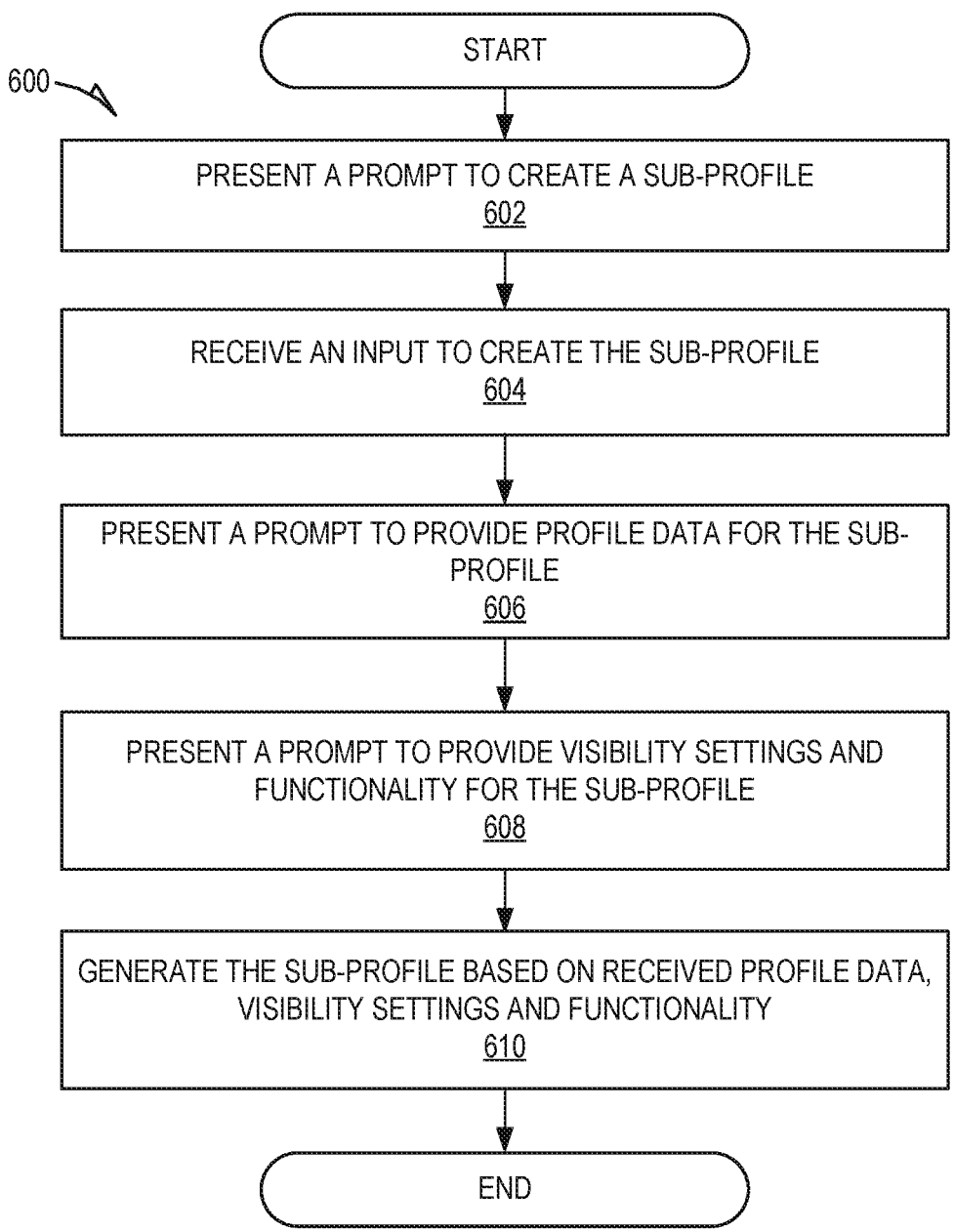
FIG. 6 is a flowchart showing a method of receiving profile data for a sub-profile to express intent within a user profile, according to some example embodiments.

FIG. 6 is a flowchart showing a method 600 of receiving profile data for a sub-profile to express intent within a user profile, according to some example embodiments. The method 600 may be embodied in computer readable instructions for execution by one or more processors such that the operations of the method 600 may be performed in part or in whole by the profile management system 108; accordingly, the method 600 is described below by way of example with reference thereto. However, it shall be appreciated that at least some of the operations of the method 600 may be deployed on various other hardware configurations and the method 600 is not intended to be limited to the profile management system 108.

At operation 602, the sub-profile prompting module 302 presents a prompt to create a sub-profile. The sub-profile prompting module 302 prompts users to create a sub-profile. For example, the sub-profile prompting module 302 may present a prompt to create a sub-profile from within a user interface when the user logs into their account with the online service 106. As another example, sub-profile prompting module 302 may message the user a prompt to create the sub-profile, such as by sending the user an email, direct message, etc. The sub-profile prompting module 302 may prompt the user to create a sub-profile for each intent the user would like to express. Accordingly, the user's profile may include multiple sub-profiles for each of the different intents.

At operation 604, the sub-profile prompting module 302 receives an input to create the sub-profile.

At operation 606, the sub-profile data collection module 304 presents a prompt to provide profile data for the sub-profile. The sub-profile data collection module 304 collects profile data to be included in a sub-profile. For example, the sub-profile data collection module prompts the user for specified data such as by presenting text boxes that the user can use to enter the profile data, dropdown bars from which the user can select the correct profile date, etc. The sub-profile data collection module 304 may prompt the user for profile data based on the intent of the sub-profile. Sub-profiles may be used to express intents such as the user being interested in new career opportunities, selling services, interested in philanthropy, interested in mentoring, etc. In these types of embodiments, the sub-profile data collection module 304 may utilize a sub-profile template for the corresponding intent when prompting the user for profile data. The sub-profile template for each intent defines the types of profile data that are included in the sub-profile as well default visibility settings and functionality for the sub-profile. For example, a sub-profile template to express an intent such as the user being interested in new career opportunities may include profile data such as the user's skills, work history, desired job title and job location, as well as functionality to message the user and/or download the user's resume. As another example, the sub-profile template to express an intent such as the user providing services for sale may include profile data describing the service provided, the cost, the geographic location in which the service is offered, as well as functionality to message the user and/or book the services.

At operation 608, the sub-profile visibility module 306 and the sub-profile functionality module 308 present prompts to provide visibility settings and functionality for the sub-profile. The sub-profile visibility configuration module 306 prompts the user to select visibility settings for the sub-profile. The available visibility setting that the sub-profile visibility configuration module 306 allows the user to select from may vary based on the intent of the sub-profile. Further, the sub-profile visibility configuration module 306 may assign default visibility settings. For example, the sub-profile visibility configuration module 306 may assign default visibility settings based on the intent of the sub-profile.

The sub-profile functionality module 308 prompts the user to select functionality to be provided along with the sub-profile. The available functionality that the sub-profile functionality module 308 allows the user to select from may vary based on the intent of the sub-profile. Further, the sub-profile functionality module 308 may assign default functionality based on the intent of the sub-profile.

At operation 610, the sub-profile generation module 310 generates the sub-profile based on the received profile data, visibility data and functionality. The sub-profile generation module 310 generates a sub-profile based on the profile data and configurations (e.g., visibility settings, selected features, etc.) provided by the user. For example, the sub-profile generation module 310 updates the user's profile in the data storage 214 to include the data associated with each generated sub-profile.

Software Architecture

Figure 7:
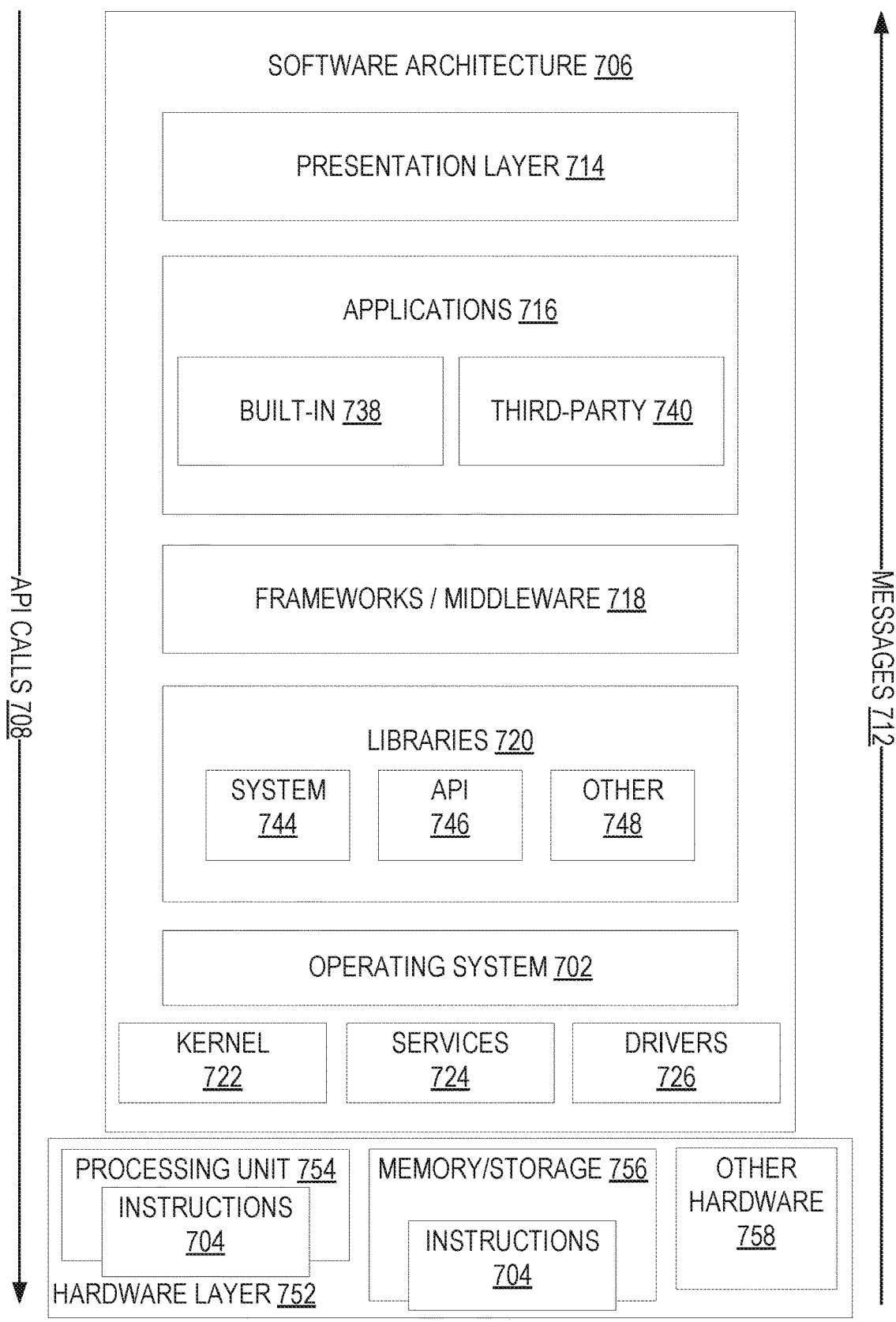
FIG. 7 is a block diagram illustrating a representative software architecture, which may be used in conjunction with various hardware architectures herein described.

FIG. 7 is a block diagram illustrating an example software architecture 706, which may be used in conjunction with various hardware architectures herein described. FIG. 7 is a non-limiting example of a software architecture 706 and it will be appreciated that many other architectures may be implemented to facilitate the functionality described herein. The software architecture 706 may execute on hardware such as machine 800 of FIG. 8 that includes, among other things, processors 804, memory 814, and (input/output) I/O components 818. A representative hardware layer 752 is illustrated and can represent, for example, the machine 800 of FIG. 8. The representative hardware layer 752 includes a processing unit 754 having associated executable instructions 704. Executable instructions 704 represent the executable instructions of the software architecture 706, including implementation of the methods, components, and so forth described herein. The hardware layer 752 also includes memory and/or storage modules 756, which also have executable instructions 704. The hardware layer 752 may also comprise other hardware 758.

In the example architecture of FIG. 7, the software architecture 706 may be conceptualized as a stack of layers where each layer provides particular functionality. For example, the software architecture 706 may include layers such as an operating system 702, libraries 720, frameworks/middleware 718, applications 716, and a presentation layer 714. Operationally, the applications 716 and/or other components within the layers may invoke application programming interface (API) calls 708 through the software stack and receive a response such as messages 712 in response to the API calls 708. The layers illustrated are representative in nature and not all software architectures have all layers. For example, some mobile or special purpose operating systems may not provide a frameworks/middleware 718, while others may provide such a layer. Other software architectures may include additional or different layers.

The operating system 702 may manage hardware resources and provide common services. The operating system 702 may include, for example, a kernel 722, services 724, and drivers 726. The kernel 722 may act as an abstraction layer between the hardware and the other software layers. For example, the kernel 722 may be responsible for memory management, processor management (e.g., scheduling), component management, networking, security settings, and so on. The services 724 may provide other common services for the other software layers. The drivers 726 are responsible for controlling or interfacing with the underlying hardware. For instance, the drivers 726 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 720 provide a common infrastructure that is used by the applications 716 and/or other components and/or layers. The libraries 720 provide functionality that allows other software components to perform tasks in an easier fashion than to interface directly with the underlying operating system 702 functionality (e.g., kernel 722, services 724, and/or drivers 726). The libraries 720 may include system libraries 744 (e.g., C standard library) that may provide functions such as memory allocation functions, string manipulation functions, mathematical functions, and the like. In addition, the libraries 720 may include API libraries 746 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 720 may also include a wide variety of other libraries 748 to provide many other APIs to the applications 716 and other software components/modules.

The frameworks/middleware 718 (also sometimes referred to as middleware) provide a higher-level common infrastructure that may be used by the applications 716 and/or other software components/modules. For example, the frameworks/middleware 718 may provide various graphical user interface (GUI) functions, high-level resource management, high-level location services, and so forth. The frameworks/middleware 718 may provide a broad spectrum of other APIs that may be used by the applications 716 and/or other software components/modules, some of which may be specific to a particular operating system 702 or platform.

The applications 716 include built-in applications 738 and/or third-party applications 740. Examples of representative built-in applications 738 may include, but are not limited to, a contacts application, a browser application, a book reader application, a location application, a media application, a messaging application, and/or a game application. Third-party applications 740 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 740 may invoke the API calls 708 provided by the mobile operating system (such as operating system 702) to facilitate functionality described herein.

The applications 716 may use built in operating system functions (e.g., kernel 722, services 724, and/or drivers 726), libraries 720, and frameworks/middleware 718 to create UIs to interact with users of the system. Alternatively, or additionally, in some systems, interactions with a user may occur through a presentation layer, such as presentation layer 714. In these systems, the application/component "logic" can be separated from the aspects of the application/component that interact with a user.

Figure 8:
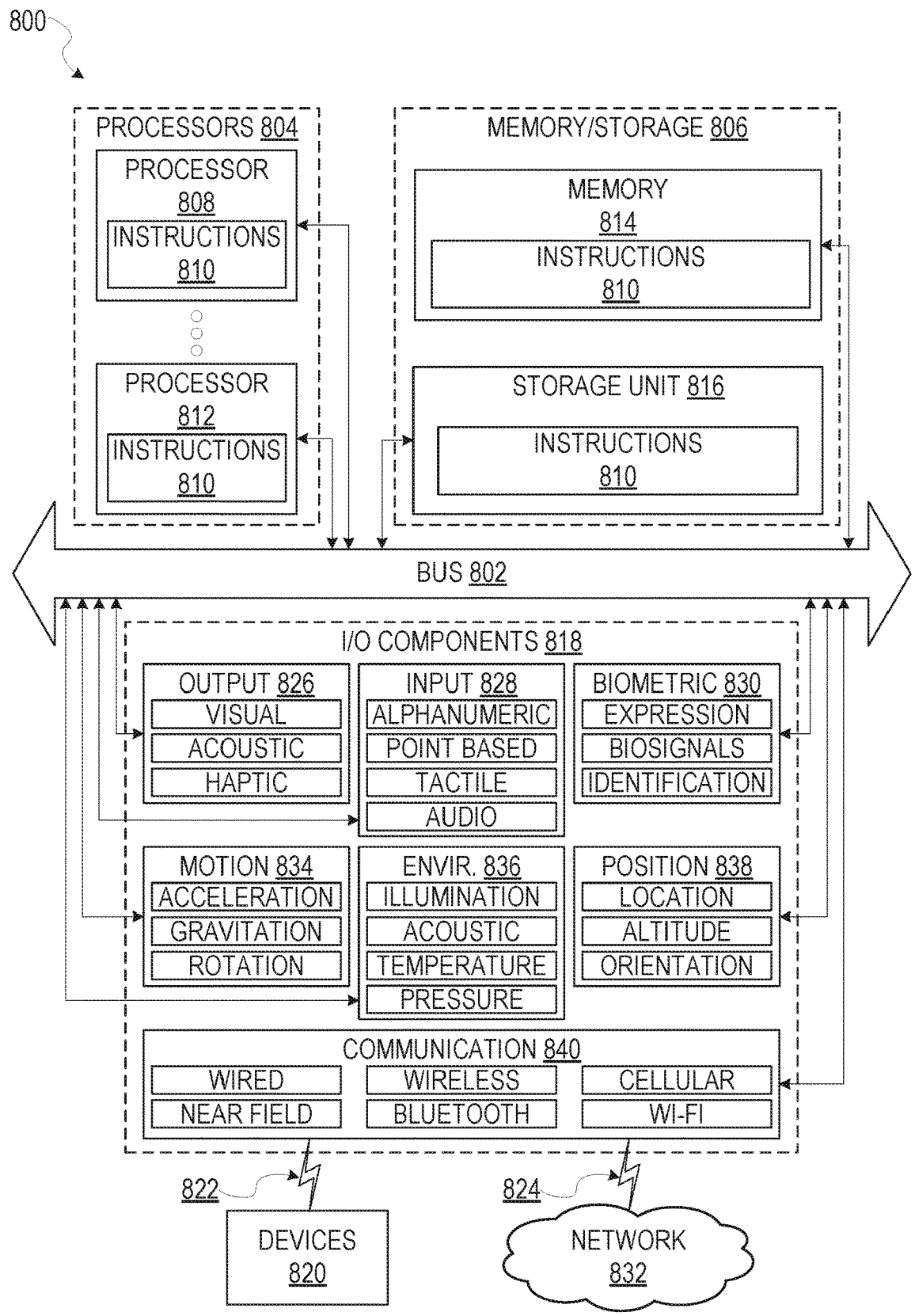
FIG. 8 is a block diagram illustrating components of a machine, according to some example embodiments, able to read instructions from a machine-readable medium (e.g., a machine-readable storage medium) and perform any one or more of the methodologies discussed herein.

FIG. 8 is a block diagram illustrating components of a machine 800, according to some example embodiments, able to read instructions 704 from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 810 (e.g., software, a program, an application, an applet, an app, or other executable code) for causing the machine 800 to perform any one or more of the methodologies discussed herein may be executed. As such, the instructions 810 may be used to implement modules or components described herein. The instructions 810 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 800 capable of executing the instructions 810, sequentially or otherwise, that specify actions to be taken by machine 800. Further, while only a single machine 800 is illustrated, the term "machine" shall also be taken to include a collection of machines that individually or jointly execute the instructions 810 to perform any one or more of the methodologies discussed herein.

The machine 800 may include processors 804, memory/storage 806, and I/O components 818, which may be configured to communicate with each other such as via a bus 802. The memory/storage 806 may include a memory 814, such as a main memory, or other memory storage, and a storage unit 816, both accessible to the processors 804 such as via the bus 802. The storage unit 816 and memory 814 store the instructions 810 embodying any one or more of the methodologies or functions described herein. The instructions 810 may also reside, completely or partially, within the memory 814, within the storage unit 816, within at least one of the processors 804 (e.g., within the processor's cache memory), or any suitable combination thereof, during execution thereof by the machine 800. Accordingly, the memory 814, the storage unit 816, and the memory of processors 804 are examples of machine-readable media.

The I/O components 818 may include a wide variety of components to receive input, provide output, produce output, transmit information, exchange information, capture measurements, and so on. The specific I/O components 818 that are included in a particular machine 800 will depend on the type of machine. For example, portable machines such as mobile phones will likely include a touch input device or other such input mechanisms, while a headless server machine will likely not include such a touch input device. It will be appreciated that the I/O components 818 may include many other components that are not shown in FIG. 8. The I/O components 818 are grouped according to functionality merely for simplifying the following discussion and the grouping is in no way limiting. In various example embodiments, the IO components 818 may include output components 826 and input components 828. The output components 826 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 828 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 818 may include biometric components 830, motion components 834, environmental components 836, or position components 838 among a wide array of other components. For example, the biometric components 830 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 834 may include acceleration sensor components (e.g., accelerometer), gravitation sensor components, rotation sensor components (e.g., gyroscope), and so forth. The environmental components 836 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 838 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 818 may include communication components 840 operable to couple the machine 800 to a network 832 or devices 820 via coupling 824 and coupling 822, respectively. For example, the communication components 840 may include a network interface component or other suitable device to interface with the network 832. In further examples, communication components 840 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 820 may be another machine or any of a wide variety of peripheral devices (e.g., a peripheral device coupled via a USB).

Moreover, the communication components 840 may detect identifiers or include components operable to detect identifiers. For example, the communication components 840 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 840 such as location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions 810 for execution by the machine 800, and includes digital or analog communications signals or other intangible medium to facilitate communication of such instructions 810. Instructions 810 may be transmitted or received over the network 832 using a transmission medium via a network interface device and using any one of a number of well-known transfer protocols.

"CLIENT DEVICE" in this context refers to any machine 800 that interfaces to a communications network 832 to obtain resources from one or more server systems or other client devices 102, 104. A client device 102, 104 may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 832.

"COMMUNICATIONS NETWORK" in this context refers to one or more portions of a network 832 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 832 or a portion of a network 832 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 810 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 810. The term "machine-readable medium" shall also be taken to include any medium, or combination of multiple media, that is capable of storing instructions 810 (e.g., code) for execution by a machine 800, such that the instructions 810, when executed by one or more processors 804 of the machine 800, cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 804) may be configured by software (e.g., an application 716 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 804 or other programmable processor 804. Once configured by such software, hardware components become specific machines 800 (or specific components of a machine 800) uniquely tailored to perform the configured functions and are no longer general-purpose processors 804. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 804 configured by software to become a special-purpose processor, the general-purpose processor 804 may be configured as respectively different special-purpose processors (e.g., comprising different hardware components) at different times. Software accordingly configures a particular processor or processors 804, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 802) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 804 that are temporarily configured (e.g., by software) or permanently configured to perform the relevant operations. Whether temporarily or permanently configured, such processors 804 may constitute processor-implemented components that operate to perform one or more operations or functions described herein. As used herein, "processor-implemented component" refers to a hardware component implemented using one or more processors 804. Similarly, the methods described herein may be at least partially processor-implemented, with a particular processor or processors 804 being an example of hardware. For example, at least some of the operations of a method may be performed by one or more processors 804 or processor-implemented components. Moreover, the one or more processors 804 may also operate to support performance of the relevant operations in a "cloud computing" environment or as a "software as a service" (SaaS). For example, at least some of the operations may be performed by a group of computers (as examples of machines 800 including processors 804), with these operations being accessible via a network 832 (e.g., the Internet) and via one or more appropriate interfaces (e.g., an API). The performance of certain of the operations may be distributed among the processors 804, not only residing within a single machine 800, but deployed across a number of machines 800. In some example embodiments, the processors 804 or processor-implemented components may be located in a single geographic location (e.g., within a home environment, an office environment, or a server farm). In other example embodiments, the processors 804 or processor-implemented components may be distributed across a number of geographic locations.

"PROCESSOR" in this context refers to any circuit or virtual circuit (a physical circuit emulated by logic executing on an actual processor 804) that manipulates data values according to control signals (e.g., "commands," "op codes," "machine code," etc.) and which produces corresponding output signals that are applied to operate a machine 800. A processor 804 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 804 may further be a multi-core processor having two or more independent processors 804 (sometimes referred to as "cores") that may execute instructions 810 contemporaneously.

What is claimed is:

1. A method comprising:
  receiving a first set of profile data for a first account of an online service, the first set of profile data associated with a first set of visibility settings dictating access to the first set of profile data within a profile of the first account;
  receiving a second set of profile data for inclusion in a first sub-profile of the profile of the first account;
  receiving a second set of visibility settings for the second set of profile data, the second set of visibility settings dictating access to the second set of profile data within the profile of the first account, the second set of visibility settings being different than the first set of visibility settings;
  receiving, from a client device, a request to access the profile of the first account, the request being associated with a second account of the online service;
  determining, based on the second account of the online service and the first set of visibility settings, that the second account is granted access to the first set of profile data;
  determining, based on the second account of the online service and the second set of visibility settings, that the second account is restricted from accessing the second set of profile data;
  generating a first version of the profile based on determining that the second account is granted access to the first set of profile data and the second account is restricted from accessing the second set of profile data, the first version of the profile including the first set of profile data and not including the second set of profile data; and
  causing presentation of the first version of the profile on a display of the client device.

2. The method of claim 1, wherein the first version of the profile includes a first portion and a second portion, the first portion including profile data from the first set of profile data and the second portion including profile data from the second set of profile data.

3. The method of claim 2, wherein generating the first version of the profile comprises:
  identifying, based on the first set of visibility settings, the profile data from the first set of profile data to include in the first portion of the profile; and
  identifying, based on the second set of visibility settings, the profile data from the second set of profile data.

4. The method of claim 1, wherein the first set of visibility settings defines a set of accounts of the online service that are granted access to the first set of profile data, and the second set of visibility settings identifies at least one account from the set of accounts that is prohibited from accessing the second set of profile data.

5. The method of claim 4, wherein the set of accounts includes accounts that have an established connection with the first account.

6. The method of claim 1, further comprising:
  receiving a third set of profile data for inclusion in a second sub-profile of the profile of the first account; and
  receiving a third set of visibility settings for the third set of profile data, the third set of visibility settings dictating access to the third set of profile data within the profile of the first account, the third set of visibility settings being different than the first set of visibility settings and the second set of visibility settings, wherein the first version of the profile is further generated based on the third set of visibility settings.

7. The method of claim 1, further comprising:
  receiving, from a second client device, a second request to access the profile of the first account, the second request being associated with a third account of the online service;
  generating a second version of the profile based on the first set of visibility settings, the second set of visibility settings, and the third account of the online service that is associated with the second request, wherein the second version of the profile is different than the first version of the profile; and causing presentation of the second version of the profile on a display of the second client device.

8. A system comprising:
one or more computer processors; and
one or more computer-readable mediums storing instructions that, when executed by the one or more computer processors, cause the system to perform operations comprising:
receiving a first set of profile data for a first account of an online service, the first set of profile data associated with a first set of visibility settings dictating access to the first set of profile data within a profile of the first account;
receiving a second set of profile data for inclusion in a first sub-profile of the profile of the first account;
receiving a second set of visibility settings for the second set of profile data, the second set of visibility settings dictating access to the second set of profile data within the profile of the first account, the second set of visibility settings being different than the first set of visibility settings;
receiving, from a client device, a request to access the profile of the first account, the request being associated with a second account of the online service;
determining, based on the second account of the online service and the first set of visibility settings, that the second account is granted access to the first set of profile data;
determining, based on the second account of the online service and the second set of visibility settings, that the second account is restricted from accessing the second set of profile data;
generating a first version of the profile based on determining that the second account is granted access to the first set of profile data and the second account is restricted from accessing the second set of profile data, the first version of the profile including the first set of profile data and not including the second set of profile data; and
causing presentation of the first version of the profile on a display of the client device.

9. The system of claim 8, wherein the first version of the profile includes a first portion and a second portion, the first portion including profile data from the first set of profile data and the second portion including profile data from the second set of profile data.

10. The system of claim 9, wherein generating the first version of the profile comprises:
identifying, based on the first set of visibility settings, the profile data from the first set of profile data to include in the first portion of the profile; and
identifying, based on the second set of visibility settings, the profile data from the second set of profile data.

11. The system of claim 8, wherein the first set of visibility settings defines a set of accounts of the online service that are granted access to the first set of profile data, and the second set of visibility settings identifies at least one account from the set of accounts that is prohibited from accessing the second set of profile data.

12. The system of claim 11, wherein the set of accounts includes accounts that have an established connection with the first account.

13. The system of claim 8, the operations further comprising:
receiving a third set of profile data for inclusion in a second sub-profile of the profile of the first account; and receiving a third set of visibility settings for the third set of profile data, the third set of visibility settings dictating access to the third set of profile data within the profile of the first account, the third set of visibility settings being different than the first set of visibility settings and the second set of visibility settings, wherein the first version of the profile is further generated based on the third set of visibility settings.

14. The system of claim 8, the operations further comprising:
receiving, from a second client device, a second request to access the profile of the first account, the second request being associated with a third account of the online service;
generating a second version of the profile based on the first set of visibility settings, the second set of visibility settings, and the third account of the online service that is associated with the second request, wherein the second version of the profile is different than the first version of the profile; and
causing presentation of the second version of the profile on a display of the second client device.

15. A non-transitory computer-readable medium storing instructions that, when executed by one or more computer processors of one or more computing devices, cause the one or more computing devices to perform operations comprising:
receiving a first set of profile data for a first account of an online service, the first set of profile data associated with a first set of visibility settings dictating access to the first set of profile data within a profile of the first account;
receiving a second set of profile data for inclusion in a first sub-profile of the profile of the first account;
receiving a second set of visibility settings for the second set of profile data, the second set of visibility settings dictating access to the second set of profile data within the profile of the first account, the second set of visibility settings being different than the first set of visibility settings;
receiving, from a client device, a request to access the profile of the first account, the request being associated with a second account of the online service;
determining, based on the second account of the online service and the first set of visibility settings, that the second account is granted access to the first set of profile data;
determining, based on the second account of the online service and the second set of visibility settings, that the second account is restricted from accessing the second set of profile data; generating a first version of the profile based on determining that the second account is granted access to the first set of profile data and the second account is restricted from accessing the second set of profile data, the first version of the profile including the first set of profile data and not including the second set of profile data; and
causing presentation of the first version of the profile on a display of the client device.

16. The non-transitory computer-readable medium of claim 15, wherein the first version of the profile includes a first portion and a second portion, the first portion including profile data from the first set of profile data and the second portion including profile data from the second set of profile data.

17. The non-transitory computer-readable medium of claim 16, wherein generating the first version of the profile comprises:
- identifying, based on the first set of visibility settings, the profile data from the first set of profile data to include in the first portion of the profile; and
- identifying, based on the second set of visibility settings, the profile data from the second set of profile data.

18. The non-transitory computer-readable medium of claim 15, wherein the first set of visibility settings defines a set of accounts of the online service that are granted access to the first set of profile data, and the second set of visibility settings identifies at least one account from the set of accounts that is prohibited from accessing the second set of profile data, the set of accounts including accounts that have an established connection with the first account.

19. The non-transitory computer-readable medium of claim 15, the operations further comprising:
- receiving a third set of profile data for inclusion in a second sub-profile of the profile of the first account; and
- receiving a third set of visibility settings for the third set of profile data, the third set of visibility settings dictating access to the third set of profile data within the profile of the first account, the third set of visibility settings being different than the first set of visibility settings and the second set of visibility settings, wherein the first version of the profile is further generated based on the third set of visibility settings.

20. The non-transitory computer-readable medium of claim 15, the operations further comprising:
- receiving, from a second client device, a second request to access the profile of the first account, the second request being associated with a third account of the online service;
- generating a second version of the profile based on the first set of visibility settings, the second set of visibility settings, and the third account of the online service that is associated with the second request, wherein the second version of the profile is different than the first version of the profile; and
- causing presentation of the second version of the profile on a display of the second client device.

\* \* \* \* \*

UNITED STATES PATENT AND TRADEMARK OFFICE
CERTIFICATE OF CORRECTION

PATENT NO. : 11,233,798 B2
APPLICATION NO. : 16/588849
DATED : January 25, 2022
INVENTOR(S) : Guo et al.

Page 1 of 1

It is certified that error appears in the above-identified patent and that said Letters Patent is hereby corrected as shown below:

In the Claims

In Column 24, Line 53, in Claim 15, after "data;", insert a linebreak

Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*